United States Patent Office 3,203,983
Patented Aug. 31, 1965

3,203,983
CERTAIN SUBSTITUTED NORBORNENES AND NORBORNANES
George Ireland Poos, Ambler, Pa., assignor to McNeil Laboratories, Incorporated, a corporation of Pennsylvania
No Drawing. Filed June 2, 1961, Ser. No. 114,289
11 Claims. (Cl. 260—518)

This is a continuation-in-part of application Serial No. 26,441, filed May 3, 1960, now abandoned.

This invention relates to a new series of organic compounds. More particularly, the present invention is concerned with 7-$R_1$,$R_2$-Y-2-$R_3$-3-$R_4$-norbornenes, the corresponding norbornanes and their salts.

The compounds of the present invention are those wherein the $R_1$,$R_2$-bearing Y is a saturated or unsaturated aliphatic group from two to seven carbon atoms, one of which comprises the 7-position carbon atom of the norbornene-(ane) nucleus and may, if desired, be further substituted by a hydroxy group or epoxy radical. Suitable saturated or unsaturated aliphatic groups include alkyl, i.e. methyl, ethyl, propyl, isopropyl, butyl, isobutyl, etc., or alkylene, i.e. methylene, ethylene, propylene, isopropylene, butylene, isobutylene, etc.

$R_1$ and $R_2$=the same or different, substituted or unsubstituted aromatic lower carbocyclic aryl radicals such as phenyl, tolyl or naphthyl. Substituents in these aromatic nuclei may be, for example, hydroxyl; lower alkyl radicals, e.g. methyl, ethyl, propyl, butyl, or pentyl; lower alkoxy radicals, e.g. methoxy, ethoxy, propoxy, isopropoxy, butoxy, isobutoxy, pentoxy, isopentoxy, or hexoxy; lower alkenyloxy radicals, for example 3-oxapentyloxy, halogen atoms, for example chloro, bromo, fluoro, or iodo; amino groups, especially tertiary amino groups, such as di-lower alkylamino groups, for example dimethyl-, diethyl-, or dibutylamino; or amino lower alkoxy groups, such as di-lower alkylamino lower alkoxy groups, for example dimethyl aminoethoxy. In these groups, the same or different aromatic lower carbocyclic nucleus may contain identical or different substituents which may occupy the same or different positions in the nuclei. $R_1$ and $R_2$ may also be aliphatic, i.e. lower alkyl radicals, such as, for example, methyl, ethyl, propyl, isopropyl, butyl, isobutyl, pentyl, isopentyl, etc. which may, if desired, contain one or more further substituents as, for example, a hydroxy or amino group. $R_1$ and $R_2$ may further be heterocyclic substituents containing from four to five carbon atoms interrupted by oxygen, nitrogen, or sulfur linkages as, for example, pyrrolidyl, piperidyl, morpholyl, thiamorpholyl, pyridyl, thienyl, furyl, piperazinyl, etc., and aralkyl substituents as, for example, benzyl, phenethyl.

$R_3$=carboxamido, substituted carboxamido, amino, aminomethyl, and substituted aminomethyl, i.e. alkyl and dialkylaminomethyl, i.e. methylaminomethyl, dimethylaminomethyl, ethylaminomethyl, diethylaminomethyl, etc.; hydrogen; carboxyl; esterified carboxyl or hydroxymethyl, etc.

If desired, the novel compounds may be further substituted at any one of the available positions in the ring nucleus by any one or more of the substituents defined hereinabove or $R_1$, $R_2$, $R_3$ and $R_4$. It will be understood, therefore, that if such further substitution is effected, the corresponding 7-$R_1$,$R_2$-Y-2-$R_3$-5-norbornene-$R_5$-3-$R_3$ compounds and their corresponding norbornanes will result, $R_5$ in the aforementioned generic formula being the substituent further included in the ring. In addition, further substituents includable for $R_5$ are lower alkynyl, for example propargyl; cycloalkyl, for example cyclopentyl or cyclohexyl; cycloalkyl, lower alkyl, for example cyclopentylpropyl or cyclohexylethyl. Where $R_4$ is a lower hydrocarbon group, it may contain further substituents such as nitro, amino, hydroxyl groups or halogen atoms. The hydroxyl groups may be free, etherified or esterified as, for example, methoxy or ethoxy groups. Amino substituents may be linked to a lower hydrocarbon group (represented by $R_5$) or they may be attached directly to the ring, i.e. they may be $R_5$. In either case, such substituents may be primary, secondary, or tertiary amino groupings as, for example, lower alkylamino, or di-lower alkylamino, i.e. dimethylamino, diethylamino, N-cyclopentyl-N-methylamino, N-benzyl-N-methylamino, pyrrolidino, piperidino, 4-methylpiperidino, morpholino, thiamorpholinopiperazino, 4-methylpiperazino, 4-hydroxyethylpiperazino. The preferred compounds in this series are those wherein the $R_1$ and $R_2$ substituents are aromatic lower carbocyclic, $R_3$ is carboxamide, $R_4$ is carboxyl and Y is a single carbon joined to the 7-carbon atom through a double bond.

The 7-$R_1$,$R_2$-Y-2-$R_3$-3-$R_4$-norbornenes and the corresponding norbornanes may be prepared from the known 7-$R_1$,$R_2$-Y-5-norbornene-2,3-dicarboxylic anhydrides by splitting the anhydride under appropriate alkaline conditions as, for example, in the presence of an amine such as an alkylamine, i.e. methylamine, ethylamine, or propylamine, in the presence of a suitable inert organic solvent such as an alkanol, i.e. methanol, ethanol, propanol, acetone, an ether or a hydrocarbon such as benzene, toluene, xylene, hexane, and mixtures thereof with each other, with water or both. Alternatively, the compounds may be prepared by reaction of the appropriate fulvene with a substituted or unsubstituted acrylic acid derivative or by cleaving the imide with a suitable strong base such as an alkali-metal hydroxide or alkoxide.

Depending upon the reaction conditions or starting materials employed, the $R_3$ and $R_4$ substituents may be either in the "exo" or "endo" configuration with respect to the bicyclic nucleus in three-dimensional representation. It is to be understood, therefore, that the novel compounds, as generically described and claimed, are intended to embrace both these configurations, it being well within the purview of one skilled in the art to determine which end configuration is desired by initiating the process with the appropriate starting material. The examples given below are, therefore, to be understood as illustrations of discrete species, not as limitations upon the scope of the invention or as restrictive exemplifications of "exo" or "endo" configurations of a given compound.

Conversion of $R_3$ and $R_4$ substituents into other functional groups may be suitably accomplished by known procedures. Thus, if the $R_4$ substituent is carboxyl, it may be esterified as desired, e.g. by treatment with a suitable alcohol. Alternatively, ester groups may be saponified by treatment with suitable alkalis. Similarly, where the $R_3$ substituent is a carboxy derivative such as an amide or N-substituted amide, it may be converted into other suitable radicals by such conversions as amide:ester and, conversely, ester:amide, either of the groups being convertible into carboxyl by saponifying the compounds. In the case wherein Y bears a hydroxyl group or $R_5$ stands for a hydroxyl substituent and $R_3$ and/or $R_4$ stand for COOH, such compounds may be converted to the corresponding lactones by dehydration either thermally accompanied by removal of water or by treatment with a suitable dehydrating agent such as acetyl chloride, acetic anhydride, phosphorus oxychloride or thionyl chloride.

Depending upon the conditions employed during the course of the reaction, the novel compounds are obtained either in the form of the free acids or salts thereof. The salts are converted to the free acids in the usual manner, for example by reaction with acids such as hydrochloridic, sulfuric, phosphoric, etc. The acids can be converted to their salts by reaction with an appropriate organic or inorganic base.

The novel compounds of the present invention, more especially those wherein the $R_3$ and $R_4$ substituents are carboxamido and carboxyl respectively, are useful as intermediates in the preparation of 7-$R_1$,$R_2$-Y-N-$R_3$-5-norbornene-$R_4$-2,3 - dicarboximides and the corresponding norbornanes, which in turn are useful as intermediates in the preparation of 2-$R_3$-3a,4,7,7a-tetrahydro-4,7-($R_1$,$R_2$-Y)-$R_4$-isoindolines, the corresponding 3a,4,5,6,7,7a-hexahydro compounds, their oxides, therapeutically active acid addition salts and quaternary ammonium compounds. Those compounds wherein the $R_3$ and $R_4$ substituents are other than carboxamide and carboxyl may be converted to the aforementioned isoindolines by direct intramolecular alkylation of the nitrogen.

The novel compounds, advantageously those wherein the $R_3$ and $R_4$ substituents are carboxamido and carboxyl respectively, are converted to the corresponding carboximides by ring closure which is suitably accomplished by heating the acid in the presence or absence of an inert organic solvent such as hydrocarbon or halogenated hydrocarbon, for example toluene, benzene, xylene, hexane, heptane, tetrahydrofuran, dioxane, diethylether, chlorobenzene, carbon tetrachloride, chloroform, etc. The temperature conditions may vary from 50° C. up to the boiling point of the particular solvent employed. Means other than heat may be used to effectuate ring closure. These include treatment with suitable dehydrating agents such as polyphosphoric acid, phosphoric acid, phosphorous oxyhalides, phosphorous halides, thionyl chloride or phosphorous pentoxide; acid anhydrides such as acetic anhydrides or propionic anhydride; organic acid chlorides such as acetyl chloride or benzoyl chloride.

Ring closure, if desired, may also be advantageously accomplished by treatment of the acid with one of the above-mentioned dehydrating agents in the presence of an inorganic or organic base, for example an alkali or alkaline earth metal hydroxide, carbonate or bicarbonate, e.g. potassium hydroxide, sodium hydroxide, sodium or potassium carbonate or bicarbonate or the corresponding calcium compounds. Also suitable for this purpose are the salts of organic acids, for example alkali- and alkaline earth metal salts of weak organic acids such as sodium acetate, potassium acetate or calcium propionate, or tertiary amines such as pyridine, trimethylamine, triethylamine, etc.

Conversion of the above-mentioned norbornene dicarboximides and the corresponding norbornane dicarboximides to the therapeutically useful tetrahydro- and hexahydroisoindolines is suitably accomplished by treatment with a reducing agent. Suitable for this purpose are the di-light metal hydrides such as alkali metal aluminum hydrides, for example lithium aluminum hydride, alkali metal borohydrides, for example lithium, sodium, or potassium borohydride. These hydrides may be employed in the presence of suitable solvents, such as ethers, for example diethylether, dibutylether, tetrahydrofuran or dioxane.

The therapeutically active 2-$R_3$-3a,4,7,7a-tetrahydro-4,7-($R_1$,$R_2$-Y)-$R_4$-isoindolines and the corresponding 3a,4,5,6,7,7a-hexahydro compounds are described in detail in co-pending application, Serial No. 114,287, filed June 2, 1961, now having matured to U.S. Patent 3,100,776, which is a continuation-in-part application of Serial No. 26,442, filed May 3, 1960, now abandoned. The compounds are useful in the treatment of peptic ulcer. This property has been demonstrated by inhibition of ulcer production in the rat by the method of Shay and also in ulcers produced by the method of restraint. In actual size, the final products which are preferable from the claimed compounds may be employed in doses from about 0.5 to about 50 milligrams per kilogram body weight and may be used in the form of pharmaceutical preparations which contain the compounds, their addition salts, quaternary ammonium compounds, their N-oxides in admixture with pharmaceutical organic or inorganic solvents or liquid carriers suitable for oral or parenteral administration.

If the starting material employed contains a carbon-carbon double bond either in the ring or at the extracyclic Y-position, or both, and it is desired to remove either one or both of these double bonds (as the case may be) this may be accomplished by reduction with hydrogen in the presence of a catalyst selected from the metals of the eighth group of the periodic system, such as nickel, palladium, platinum, ruthenium or rhodium, which may be supported on a carrier such as barium carbonate or charcoal. Reduction of this nature is conducted in the presence of a solvent such as an alkanol, for example, methanol or ethanol and, if so desired, under pressure.

The following examples are illustrative of, but not limitative on, the novel aspects of this invention.

*Example I*

To a solution of sodium ethoxide prepared by adding 11.5 parts by weight of sodium to 300 parts by volume of absolute ethanol under nitrogen is added 91.2 parts by weight of benzophenone followed by a solution of 57.6 parts by weight of freshly prepared cyclopentadiene in 100 parts by volume of absolute ethanol. The addition is carried out with good stirring for a period of about ten minutes, during which time the undissolved benzophenone dissolves, yielding a dark red solution. After about ten minutes of stirring at room temperature, the product begins to crystallize from the solution and after stirring an additional one and one-half hours at room temperature, the mixture is cooled in an ice-bath and kept at 0° C. for one-half hour. The product is then collected on a filter, washed with several portions of absolute alcohol, and dried, yielding diphenylfulvene, melting point 79.5° C. to 82° C. Concentration of the mother liquors yields a second crop. The two crops are combined and recrystallized from absolute alcohol to provide a pure diphenylfulvene, melting point 81° C. to 82° C.

*Example II*

A solution of 36.5 parts by weight of diphenylfulvene and 15.5 parts by weight of maleic anhydride in 160 parts by volume of benzene is heated under reflux for a period of about twenty minutes. The solution is cooled in an ice-bath, the precipitated solid diluted with petroleum ether and the resulting slurry collected on a filter, washed with petroleum ether and is dried. There is obtained endo-7-diphenylmethylene - 5-norbornene-1,3-dicarboxylic anhydride, melting point 151° C. to 158° C.

*Example III*

To 300 parts by volume of methanol cooled below 0° C. in an acetone-Dry Ice bath is added a solution of 10 parts by volume of methylamine in 50 parts by volume of cold methanol. To the resulting solution, cooled in an ice-bath with stirring, is added 42.2 parts by weight of endo-7-diphenylmethylene - 5 - norbornene-2,3-dicarboxylic anhydride. The ice-bath is removed, and the mixture is allowed to come to room temperature and then to stand overnight. The solution is concentrated to dryness, the residue is slurried in water, and the resulting aqueous suspension made acidic with dilute hydrochloric acid. The precipitated acid is collected on a filter, washed with water, and dried, yielding 7-diphenylmethylene-endo-2-methylcarbamido-5-norbornene-endo - 3 - carboxylic acid, melting point 160° C. to 165° C.

*Example IV*

To a mixture of 750 parts by volume of toluene and 150 parts by volume of 2-propanol is added 27.5 parts by weight of 7-diphenylmethylene-endo-2-methylcarbamido-5-norbornene-endo-3-carboxylic acid. The resulting solution is heated to boiling and the 2-propanol is slowly distilled from the mixture. After one and one-half hours all of the 2-propanol has been distilled and the remaining solution is heated under reflux for an additional two hours. The reaction solution is concentrated to dryness under reduced pressure and the residual oil is dissolved in methylene chloride, diluted with ether and distilled to remove the bulk of the methylene chloride. Upon cooling the solution, the crystalline product separates. It is collected on a filter, washed with ether-petroleum ether and dried to give endo-7-diphenylmethylene-5-norbornene-N-methyl-2,3-dicarboximide, melting point 171° C. to 174° C.

*Example V*

To a slurry of 9.5 parts by weight of lithium aluminum hydride in 500 parts by volume of anhydrous ether is added rapidly, dropwise, a solution of 17.5 parts by weight of endo-7-diphenylmethylene-5-norbornene-N-methyl-2,3-dicarboximide in 1500 parts by volume of anhydrous ether. The mixture is heated under reflux for two and one-half hours and is allowed to stand at room temperature overnight. To the reduction mixture is added carefully dropwise 50 parts by volume of ethyl acetate and then 20 parts by volume of water. The mixture is stirred at room temperature for three hours and then filtered. The remaining inorganics are washed with ether and the combined organic solution is dried over magnesium sulfate, filtered and concentrated to dryness under reduced pressure to give endo-8-diphenylmethylene-2-methyl-3a,4,7,7a-tetrahydro - 4,7 - methanoisoindoline, melting point 74° C. to 77° C. The base is combined in methanol with 4.8 parts by weight of fumaric acid and the solution is diluted with ether, which affords crystals. The solid is filtered, washed three times with ether, and dried, yielding endo-8-diphenylmethylene-2-methyl-3a,4,7,7a-tetrahydro - 4,7 - methanoisoindoline fumarate, melting point 203.5° C. to 205.5° C. (dec.).

*Example VI*

To a boiling solution of 1.96 parts by weight of maleic anhydride in 30 parts by volume of xylene is added rapidly, dropwise, a solution of 4.6 parts by weight of diphenylfulvene in 36 parts by volume of xylene. The solution is heated under reflux for five hours and then concentrated to dryness under vacuum. The addition of ether to the residue causes crystals to separate which are collected by filtration, washed with ether and dried to provide a mixture of adducts, melting point 148° C. to 155° C., containing largely the endoisomer. Concentration of the mother liquors and cooling provides a second, larger quantity of product, melting point 135° C. to 142° C., which is largely the desired exo-7-diphenylmethylene-5-norbornene-2,3-dicarboxylic anhydride.

*Example VII*

A solution of 0.6 part by volume of methylamine in 20 parts by volume of methanol cooled below 0° C. in an acetone-Dry Ice bath is treated wth 2.5 parts by weight of exo-7-diphenylmethylene-5-norbornene-2,3-dicarboxylic anhydride. The cold bath is removed, and the solution is allowed to come to room temperature and to stand for one hour. The solution is concentrated to dryness under vacuum and the residue is partitioned between methylene chloride and dilute hydrochloric acid. Separation of the organic layer followed by drying over anhydrous magnesium sulfate and concentration to dryness gives 7-diphenylmethylene - exo - 2 - methylcarbamido-5-norbornene-exo-3-carboxylic acid, melting point 98° C. to 106° C. (dec.).

*Example VIII*

A solution of 0.9 part by weight of 7-diphenyl-methylene - exo - 2 - methylcarbamido-5-norbornene-exo-3-carboxylic acid in a mixture of 20 parts by volume of benzene and 10 parts by volume of absolute ethanol is heated under reflux for two hours and then concentrated to dryness under vacuum. The residue is dissolved in methylene chloride and the resulting solution is washed with 5% sodium carbonate solution, dried over anhydrous magnesium sulfate and concentrated to dryness. Crystallization of the residue from methylene chloride-ether gives exo-7-diphenyl-methylene-5-norbornene-N-methyl-2,3-dicarboximide, melting point 154° C. to 157° C.

*Example IX*

A mixture of 1.1 parts by weight of lithium aluminum hydride in 50 parts by volume of anhydrous ether is treated rapidly dropwise with stirring with a solution of 2.0 parts by weight of exo-7-diphenylmethylene-5-norbornene-N-methyl-2,3-dicarboximide in 150 parts by volume of anhydrous ether. The mixture is heated under reflux for three hours, cooled and carefully treated, dropwise, with stirring with 5 parts by volume of water. After stirring for three hours, the mixture is filtered and the insolubles are washed with ether. The combined filtrate and washings are dried over magnesium sulfate and evaporated to dryness to give exo-8-diphenylmethylene-2-methyl-3a,4,7,7a-tetrahydro - 4,7 - methanoisoindoline. The base is dissolved in hot 2-propanol and treated with 0.52 part of fumaric acid in 2-propanol. Cooling the solution provides crystals. The solid is filtered, washed with 2-propanol and then ether, and dried, yielding exo-8 - diphenylmethylene-2-methyl-3a,4,7,7a-tetrahydro-4,7-methanoisoindoline fumarate, melting at 176° C. to 178° C.

*Example X*

4.6 parts by weight of diphenylfulvene and 2.5 parts by weight of N-ethylmaleimide are combined in 20 parts by volume of benzene and left to stand at room temperature for four days. The solution is concentrated to dryness under reduced pressure and the residue is dissolved in ether. Upon cooling, crystals separate from the solution. The crystals are collected by filtration, washed with ether and dried to give endo-7-diphenylmethylene-N-ethyl-5-norbornene-2,3-dicarboximide, melting point 125° C. to 126° C. Concentration of the mother liquors followed by addition of petroleum ether affords a second crop melting at 110° C. to 115° C.

*Example XI*

A solution of 14 parts by weight of endo-7-diphenyl-methylene-N-ethyl-5-norbornene - 2,3 - dicarboximide in 1200 parts by volume of anhydrous ether is added dropwise to a mixture of 7.7 parts by weight of lithium aluminum hydride in 500 parts by volume of anhydrous ether. After the addition the solution is heated under reflux for two hours and then allowed to stand at room temperature overnight. The reaction mixture is hydrolyzed by the cautious dropwise addition of 23 parts by volume of water and is then allowed to stir at room temperature for two and one-half hours. The mixture is filtered and the inorganic salts are washed thoroughly with ether. The filtrate is dried over anhydrous magnesium sulfate, filtered, and concentrated to dryness under reduced pressure. There is obtained a light yellow viscous oil. On standing this product slowly crystallizes. It is dissolved in petroleum ether and cooled until formation of crystals is complete. The crystals are collected, washed with petroleum ether and dried. There is obtained endo-8-diphenyl-methylene - 2 - ethyl - 3a,4,7,7a - tetrahydro-4,7-methanoisoindoline, melting point 88° C. to 92.5° C. Recrystallization from petroleum ether affords a purified product melting at 90.5° C. to 92.5° C.

*Example XII*

A solution of 7.4 parts by weight of beta-phenethylamine in 175 parts by volume of methanol is cooled to 0° C. and treated in portions with 20 parts by weight of diphenylfulvene maleic anhydride condensation product (Example II above). After the addition is complete, the solution is allowed to warm to room temperature and to stand for three hours. The solution is then concentrated under reduced pressure to a low volume and diluted with water. Addition of a small amount of dilute hydrochloric acid completes precipitation of the product, which is collected on a filter, washed with water, and dried. There is obtained 24 parts by weight of endo-7-diphenylmethylene-endo - 2 - (N-beta-phenethylcarbamido)-5-norbornene-endo-3-carboxylic acid, melting point 131.5° C. to 133° C.

*Example XIII*

Endo - 7 - diphenylmethylene-endo-2-(N-beta-phenethylcarbamido-5-norbornene-endo-3-carboxylic acid (23 parts by weight) in 200 parts by volume of toluene is heated under reflux for four hours. Concentration of the solution to dryness yields a gummy residue which is induced to crystallize with ether. The product is collected on a filter, washed with ether and dried. There is obtained endo - 7 - diphenylmethylene-N-beta-phenethyl-5-norbornene-2,3-dicarboximide, melting at 171° C. to 174° C.

*Example XIV*

A sample of endo-2-diphenylmethylene-5-norbornene-2,3-dicarboximide (2.5 parts by weight) is added to a solution of 0.54 part by weight of potassium hydroxide in 15 parts by volume of water and 30 parts by volume of ethanol. To this solution is added 1.53 parts by weight of beta-phenethylbromide. The solution is stirred overnight at room temperature. Additional potassium hydroxide and beta-phenethylbromide are added and the solution is refluxed for two and one-half hours. The solution is concentrated in vacuo to one-half volume. The crystalline product is filtered and recrystallized from methanol giving 1.5 parts by weight of endo-7-diphenylmethylene-N-beta-phenethyl - 5 - norbornene-2,3-dicarboximide, melting point 174° C. to 176° C.

*Example XV*

A solution of 4 parts by weight of endo-7-diphenylmethylene - 2 - beta-phenethyl-5-norbornene-2,3-dicarboximide in 75 parts by volume of anhydrous tetrahydrofuran is added rapidly dropwise to a suspension of 1.41 parts by weight of lithium aluminum hydride in 100 parts by volume of the same solvent. After the addition is complete, the mixture is heated under reflux for sixteen hours and then allowed to cool. The reduction mixture is hydrolyzed by the cautious addition of 4 parts by volume of water to the well-stirred reaction mixture, and the mixture is then allowed to stir for three hours. The precipitated inorganic salts are collected on a filter, washed thoroughly with ether, and the combined filtrate and washings are concentrated to dryness. The pale yellow gummy residue is combined with 50 parts by volume of 2-propanol and 0.82 part by weight of maleic acid, and the resulting solution is diluted with ether, whereupon the crystals of the maleate precipitate. The crystals are collected on a filter, washed with ether, and dried, yielding endo - 8 - diphenylmethylene-2-beta-phenethyl-3a,4,7,7a-tetrahydro - 4,7 - methanoisoindoline maleate, melting at 178° C. to 179° C.

*Example XVI*

A solution of 4.13 parts by weight of endo-7-diphenylmethylene-N-methyl-5-norbornene-2,3-dicarboximide in 90 parts by volume of redistilled tetrahydrofuran is treated with 0.016 part by weight of 10% palladium-on-carbon and submitted to hydrogenation at atmospheric pressure. The mixture is stirred until the uptake of hydrogen has slowed and a total of 3.03 parts by volume of hydrogen has been consumed. The solution is filtered from the catalyst and concentrated to dryness under reduced pressure. The residue is dissolved in methylene chloride and ether, filtered and concentrated. Addition of petroleum ether provides crystals which are collected on a filter, washed with petroleum ether and air-dried. There is obtained endo-7-diphenylmethylene-N-methyl-2,3-norbornane-dicarboximide, melting at 137° C. to 141.5° C.

*Example XVII*

A solution of 7.3 parts by weight of endo-7-diphenylmethylene-N-methyl - 2,3 - norbornane-dicarboximide in 600 parts by volume of dry ether is added dropwise with stirring to a mixture of 4.0 parts by weight of lithium aluminum hydride in 250 parts by volume of the same solvent. The mixture is heated under reflux for two hours and allowed to stand at room temperature overnight. Hydrolysis is accomplished by the dropwise addition of 12 parts by volume of water followed by stirring at room temperature for three hours. The inorganic salts are removed by filtration and washed thoroughly with ether, and the combined ethereal filtrate and washings are dried over anhydrous magnesium sulfate, filtered, and evaporated to dryness under reduced pressure. There results a light-colored gummy residue. A solution of this product in ether is treated with a solution of 2.5 parts by weight of fumaric acid in 50 parts by volume of methanol. Further dilution of this mixture with ether affords crystals, which are collected on a filter, washed with ether and dried. There are obtained white crystals of endo-8-diphenylmethylene - 2 - methyl-3a,4,5,6,7,7a-hexahydro-4,7-methanoisoindoline fumarate, melting at 191° C. to 192° C.

*Example XVIII*

A solution of 5 parts by weight of endo-7-diphenylmethylene - N-methyl-5-norbornene-2,3-dicarboximide in 75 parts by volume of methanol plus 50 parts by volume of methylene chloride is treated with 0.25 part by weight of 10% palladium-on-carbon and subjected to hydrogen at three atmospheres pressure. After shaking the mixture for fifteen minutes an amount of hydrogen corresponding to the absorption of four atoms of hydrogen has been taken up. The solution is filtered from the catalyst and concentrated to dryness under reduced pressure. A solution of the residue in a mixture of methylene chloride and ether leads to crystals, which are collected on a filter, washed with ether and dried. After two recrystallizations from methanol-ether, pure endo-7-diphenylmethyl-N-methyl-2,3-norbornane - dicarboximide is obtained with a melting point of 206.5° C. to 209° C.

*Example XIX*

Lithium aluminum hydride (2 parts by weight) is added to 100 parts by volume of dry, freshly distilled tetrahydrofuran and to the resulting mixture with stirring is added a solution of 3.6 parts by weight of the imide described in Example XVIII in 300 parts by volume of the same solvent. After the addition is complete, the mixture is heated under reflux for five hours and then allowed to stand at room temperature overnight. Excess lithium aluminum hydride and the inorganic complexes are hydrolyzed by the cautious addition of 6 parts by volume of water. After the mixture has stood at room temperature for four hours, it is filtered and the precipitated inorganic salts are washed thoroughly with ether. The combined tetrahydrofuran filtrate and ethereal washes are concentrated to dryness under reduced pressure. The resulting basic product is dissolved in methanol and treated with a solution of 1.3 parts by weight of fumaric acid in methanol. Upon dilution with ether and cooling, crystals separate which are collected on a filter, washed with ether, and dried, yielding 3.7 parts by weight of endo - 8-diphenylmethyl-2-methyl - 3a,4,5,6,7,7a-hexahydro-4,7-methanoisoindoline fumarate with a melting point of 237° C. to 238° C.

*Example XX*

To a refluxing solution of 20.5 parts by weight of maleimide in benzene is added 22.4 parts by weight of dimethylfulvene. After two minutes at reflux, a white solid crystallizes out of solution. The resultant slurry is cooled, diluted with ether and filtered. The crystalline product is washed with ether-petroleum ether and dried, affording 37.1 parts by weight of 7-isopropylidene-5-norbornene-2,3-dicarboximide, which melts at 176° C. to 180° C., resolidifies on further heating and remelts at 197° C. to 202° C.

*Example XXI*

To a solution of 9 parts by weight of potassium hydroxide in a mixture of 250 parts by volume of water and 210 parts by volume of ethanol is added 29.6 parts by weight of 7-isopropylidene-5-norbornene-2,3-dicarboximide. To this solution is added rapidly 20.2 parts by weight of dimethylsulfate. The mixture is stirred for fifteen minutes at room temperature and one hour at reflux. The solution is then concentrated in vacuo to remove the ethanol. after cooling, the product is filtered, washed well with water and dried in vacuo over calcium chloride, affording 27.9 parts by weight of product melting at 78° C. to 123° C. After two recrystallizations from isopropyl alcohol there is obtained 13 parts by weight of pure 7-isopropylidene-N-methyl-5-norbornene-2,3-dicarboximide, melting point 142° C. to 143° C.

*Example XXII*

A solution of 1.75 parts by weight of the imide described in Example XXI in 200 parts by volume of anhydrous ether is added rapidly dropwise to a mixture of 1.6 parts by weight of lithium aluminum hydride in 50 parts by volume of dry ether. After the addition is complete, the reaction mixture is heated under reflux for four hours and then left to stand at room temperature overnight. The mixture is worked up by the careful dropwise addition of 5 parts by volume of water followed by filtration from the inorganic salts and thorough washing of the insoluble material with ether. The combined filtrates and washings are concentrated to dryness and the residue is dissolved in acetone and treated with an acetone solution of 0.8 part by weight of maleic acid. Concentration of this solution to a low volume followed by the addition of ether causes crystals of the maleate salt to separate. The product is collected on a filter, washed with ether and dried. There is obtained 1.22 parts by weight of 8-isopropylidene-2-methyl-3a,4,7,7a-tetrahydro-4,7-methanoisoindoline fumarate, melting at 144° C. to 149° C.

*Example XXIII*

To a solution of 2.3 parts by weight of sodium in 100 parts by volume of absolute ethanol is added 21.7 parts by weight of p-chlorobenzophenone and 50 parts by volume of absolute ethanol. The solution is stirred until the ketone is almost dissolved and a solution of 11.6 parts by weight of freshly distilled cyclopentadiene in 25 parts by volume of cold absolute ethanol is added rapidly dropwise with stirring. The mixture is allowed to warm to room temperature and stir for four hours, during which time the remaining starting material dissolves and orange crystals of the product separate. The mixture is concentrated under reduced pressure to a volume of about 75 parts by volume, cooled in ice, and the crystalline product collected on a filter, washed with ethanol, and dried. There is obtained 19 parts by weight of 6-p-chlorophenyl-6-phenylfulvene, melting at 73° C. to 74° C.

*Example XXIV*

A solution of 14.0 parts by weight of 6,6-p-chlorodiphenylfulvene and 4.61 parts by weight of maleimide in 120 parts by volume of benzene is refluxed for one and one-half hours and allowed to stand at room temperature for sixteen hours. The resultant mixture is diluted with petroleum ether. The crystals are collected on a filter, washed with ether and air-dried to give 14.8 parts by weight of endo-7-p-chlorodiphenylmethylene-5-norbornene-2,3-dicarboximide, melting point 205° C. to 207° C. Recrystallization from methylene chloride-ethyl acetate raises the melting point to 208° C. to 211° C.

*Example XXV*

A suspension of 13.8 parts by weight of endo-7-p-chlorodiphenylmethylene-5-norbornene-2,3-dicarboximide in 137 parts by volume of ethanol is treated with 2.45 parts by weight of potassium hydroxide in 71 parts by volume of water. The solution is stirred as 5.5 parts by weight of dimethylsulfate is added rapidly. The gummy mixture is stirred at room temperature for one hour and at reflux for one hour. It is then cooled, diluted with 120 parts by volume of ethanol and concentrated in vacuo at 35° C. The precipitate is removed by filtration, washed with ethanol and air-dried to give 13.6 parts by weight of endo-7-p-chlorodiphenylmethylene-N-methyl-5-norbornene-2,3-dicarboximide, melting at 127° C. to 134° C. A sample purified by recrystallization from methylene chloride-ether-petroleum ether shows a melting point of 132° C. to 136° C.

*Example XXVI*

To a mixture of 6.6 parts by weight of lithium aluminum hydride in 200 parts by volume of dry ether is added dropwise with stirring a solution of 12.6 parts by weight of the imide described in Example XXV in 500 parts by volume of dry ether. After the addition is complete, the reaction mixture is heated to boiling for two hours and then cooled to ice temperature. Hydrolysis is accomplished by the careful dropwise addition of 19.7 parts by volume of water to the stirring reaction mixture. After the water has been added, the mixture is allowed to stir for two hours and is then filtered from the precipitated inorganic salts which are washed with several portions of ether. The combined filtrate and washings are evaporated to dryness to yield a residual oil. A portion of this product (6.9 parts by weight) is converted to the maleate by solution in a small volume of acetone and treatment with a solution of 2.3 parts by weight of maleic acid in ether. The crystalline salt is collected on a filter and washed with ether to give 7.8 parts by weight of endo-8-p-chlorophenylmethylene-2-methyl-3a,4,7,7a,-tetrahydro-4,7-methanoisoindoline maleate, melting at 160° C. to 161° C.

*Example XXVII*

To a solution of sodium methoxide prepared by dissolving 1 part by weight of sodium in 60 parts by volume of absolute ethanol is added 7.32 parts by weight of phenyl-4-pyridylketone. This mixture is cooled to 0° C. in an ice-bath and treated dropwise with stirring under nitrogen with a solution of 6.4 parts by volume of freshly distilled cyclopentadiene in 20 parts by volume of cold absolute methanol. After the addition is complete, the resulting clear red solution is allowed to stir at ice temperature for thirty minutes and then warmed to room temperature and stir for an additional hour. The mixture is filtered and the filtrate is concentrated under reduced pressure until the ethanol has been removed to give 6-phenyl-6-(4-pyridyl)-fulvene.

*Example XXVIII*

To a solution of sodium methoxide prepared by dissolving 1 part by weight of sodium in 60 parts by volume of absolute ethanol is added 7.32 parts by weight of phenyl-3-pyridylketone. This mixture is cooled to 0° C. in an ice-bath and treated dropwise with stirring under nitrogen with a solution of 6.4 parts by volume of freshly distilled cyclopentadiene in 20 parts by volume of cold absolute methanol. After the addition is complete, the resulting clear red solution is allowed to stir at ice temperature for thirty minutes and then warmed to room temperature and stir for an additional hour. The mixture is filtered and the filtrate is concentrated under reduced pressure until the ethanol has been removed to give 6-phenyl-6-(3-pyridyl)-fulvene.

Example XXIX

To a solution of sodium methoxide prepared by dissolving 1 part by weight of sodium in 60 parts by volume of absolute ethanol is added 7.32 parts by weight of phenyl-2-pyridylketone. This mixture is cooled to 0° C. in an ice-bath and treated dropwise with stirring under nitrogen with a solution of 6.4 parts by volume of freshly distilled cyclopentadiene in 20 parts by volume of cold absolute methanol. After the addition is complete, the resulting clear red solution is allowed to stir at ice temperature for thirty minutes and then warmed to room temperature and stir for an additional hour. The mixture is filtered and the filtrate is concentrated under reduced pressure until theethanol has been removed to give 6-phenyl-6-(2-pyridyl)-fulvene.

Example XXX

A solution of 53 parts by weight of 6-phenyl-6-(2-pyridyl)-fulvene and 22.6 parts by weight of maleimide in 250 parts by volume of benzene is heated under reflux for three hours. After cooling, the solid product is collected by filtration, washed with ether and dried giving 24.2 parts by weight of a buff-colored powder melting at 210° C. to 216° C. Recrystallization from ethanol gives pure 7-(phenyl-2-pyridylmethylene)-5-norbornene-2,3-dicarboximide, melting point 217° C. to 218° C.

Example XXXI

A solution of 1.67 parts by weight of potassium hydroxide in 48 parts by volume of water is added to a suspension of 8.0 parts by weight of the dicarboximide above in 83 parts by volume of ethanol and the mixture is stirred until the imide dissolves. Dimethylsulfate, 2.54 parts by volume, is added rapidly and the product begins to precipitate in five minutes. The mixture is stirred for two and one-half hours, when the pH is then 7, cooled in an ice-bath and the product is collected by filtration. It is washed well with 40% aqueous ethanol and oven-dried to constant weight giving 5.80 parts by weight of 7-(phenyl-2-pyridylmethylene) - N - methyl-5-norbornene - 2,3-dicarboximide, melting 169° C. to 170° C.

Example XXXII

To a suspension of 6.5 parts by weight of lithium aluminum hydride in 200 parts by volume of anhydrous diethylether is added a solution of 11.7 parts by weight of 7-(phenyl-2-pyridylmethylene) - N-methyl-5-norbornene-2,3-dicarboximide in 700 parts by volume of ether and 190 parts by volume of dry tetrahydrofuran. The mixture is stirred at room temperature for two days and carefully decomposed with 19.5 parts by volume of water. The solids are removed by filtration, washed with ether and the combined filtrate and washes are concentrated to dryness giving 9.69 parts by weight of basic isoindoline product. The endo-8-phenyl-2-pyridylmethylene-2-methyl-3a,4,7,7a-tetrahydro-4,7-methanoisoindoline fumarate is prepared in isopropyl alcohol-ether and melts at 175° C. to 176° C.

Example XXXIII

To a solution of 3.35 parts by weight of sodium in 100 parts by volume of absolute ethanol is added a solution of 33.44 parts by weight of m-trifluoromethylbenzophenone in 85 parts by volume of absolute ethanol. A solution of 15.5 parts by weight of freshly distilled cyclopentadiene in 20 parts by volume of ethanol is added rapidly. The solution is stirred at room temperature for two and one-half hours. The solution is concentrated to one-half volume under vacuum, diluted with water and extracted three times with ether. The organic layer is dried over magnesium sulfate and the solvent is evaporated to give 6,6-m-trifluoromethyldiphenylfulvene.

Example XXXIV

A solution of 39 parts by weight of 6,6-m-trifluoromethyldiphenylfulvene and 12.7 parts by weight of maleimide in 200 parts by volume of benzene is heated under reflux for two and three-quarter hours and allowed to stand at room temperature for sixteen hours. The solvent is removed under vacuum and the product is crystallized from ether-petroleum ether, affording 35 parts by weight of endo-7-m - trifluoromethyldiphenylmethylene - 5 - norbornene-2,3-dicarboximide, melting at 180° C. to 193° C. after recrystallization from methylene chloride-ether-petroleum ether.

Example XXXV

To a suspension of 31.5 parts by weight of endo-7-m-trifluoromethyldiphenylmethylene-5-norbornene - 2,3 - dicarboximide in 320 parts by volume of ethanol is added a solution of 5.05 parts by weight of potassium hydroxide in 150 parts by volume of water. The mixture is heated gently to afford solution. At room temperature, 12.4 parts by weight of dimethylsulfate is added. The mixture is heated to reflux and cooled. The ethanol is removed under vacuum and the oily product is extracted into ether. The ether solution is washed with sodium bicarbonate and water. It is then dried over magnesium sulfate, filtered and concentrated to dryness in vacuo. A sample of the oily residue is taken up in ether and washed with dilute sodium hydroxide and water. The organic solution is dried over magnesium sulfate and concentrated in vacuo. After recrystallization from ether-petroleum ether, 5.7 parts by weight of endo-7-m-trifluoromethyldiphenylmethylene-N-methyl - 5 - norbornene - 2,3-dicarboximide is obtained, melting point 135° C. to 137° C.

Example XXXVI

To a suspension of 2.73 parts by weight of lithium aluminum hydride in 100 parts by volume of anhydrous ether is added slowly a solution of 5.85 parts by weight of endo-1-m-trifluoromethyldiphenylmethylene-N-methyl-5-norborene-2,3-dicarboximide in 200 parts by volume of ether. The reaction mixture is stirred at room temperature for twenty-three hours and hydrolyzed by adding 8.2 parts by volume of water. The inorganics are removed by filtration; the filtrate is dried over magnesium sulfate and the solvent evaporated in vacuo.

The oily product is dissolved in ether and dilute hydrochloric acid. The ether solution is removed and further extracted with dilute hydrochloric acid. The combined acid fractions are made basic and extracted with ether. The ether extract is dried and concentrated in vacuo to give 4.4 parts by weight of oily product.

The oily base is combined with 1.35 parts by weight of maleic acid in acetone-ether. There is obtained 4.21 parts by weight of 8-m-trifluoromethyldiophenylmethylene-2-methyl-3a,4,7,7a-tetrahydro-4,7-methanoisoindoline maleate with a melting point of 143° C. to 145.5° C.

Example XXXVII

Under nitrogen 1.17 parts by weight of potassium is added to 120 parts by volume of dried t-butanol and is dissolved by heating under reflux for one hour. A solution of 5.90 parts by weight of o-methylbenzophenone in 10 parts by volume of t-butanol is added rapidly, followed by 4.45 parts by volume of freshly distilled cyclopentadiene. A white solid precipitates. The mixture is brought into solution by heating to reflux and is then stirred under nitrogen at reflux for sixty-six hours. The dark solution is diluted with water and extracted twice with ether. The ether extracts are washed with water and dried over magnesium sulfate. Concentration of the ether solution gives 6,6-o-methyldiphenylfulvene.

Example XXXVIII

A solution of 5.34 parts by weight of 6,6-o-methyldiphenylfulvene and 1.90 parts by weight of maleimide in 50 parts by volume of benzene is heated under reflux for three hours. After cooling and diluting with petroleum ether, the product crystallizes. The crystals are removed by filtration and washed with ether-petroleum ether to give 3.98 parts by weight of endo-7-o-methyldiphenylmethylene-5-norbornene-2,3 - dicarboximide, melting point 180° C. to 190° C. After two recrystallizations from ether-petroleum ether, the product melts at 185° C. to 188.5° C.

Example XXXIX

To a suspension of 20.0 parts by weight of endo-7-o-methyldiphenylmethylene-5-norbornene-2,3-dicarboximide in 200 parts by volume of ethanol is added 3.98 parts by weight of potassium hydroxide in 115 parts by volume of water. To this solution is added 8.14 parts by weight of dimethylsulfate. The mixture is stirred at room temperature for one hour during which time the product crystallizes. After cooling in an ice-bath for one-half hour, the product is collected on a filter, washed with aqueous alcohol and air-dried to give 15.8 parts by weight of endo-7-o-methyldiphenylmethylene - N - methyl - 5 - norbornene-2,3-dicarboximide, melting point 161° C. to 162° C.

Example XL

A solution of 14.68 parts by weight of endo-7-o-methyldiphenylmethylene-N-methyl-5-norbornene-2,3-dicarboximide in 800 parts by volume of anhydrous ether is added slowly to a suspension of 7.75 parts by weight of lithium aluminum hydride in 200 parts by volume of ether. The mixture is refluxed for five hours and allowed to stand at room temperature for sixteen hours. The mixture is hydrolyzed by the slow addition of 23.2 parts by volume of water. The inorganics are removed by filtration. The ether filtrate is dried over magnesium sulfate, filtered and concentrated to dryness in vacuo. The residue is a yellow oil, 13.1 parts by weight. To 12.4 parts by weight of this oil, dissolved in ether, is added a solution of 4.34 parts by weight of maleic acid in acetone. The product crystallizes and is collected on a filter and washed with acetone-ether. There is obtained 12.6 parts by weight of endo-8-o-methyldiphenylmethylene-2-methyl-3a,4,7,7a-tetrahydro-4,7-methanoisoindoline maleate, melting at 140.5° C. to 142° C.

Example XLI

To a solution of 2.3 parts by weight of sodium in 80 parts by volume of ethanol is added a solution of 12 parts by weight of acetophenone and 11.6 parts by weight of cyclopentadiene under nitrogen. After stirring for forty-five minutes, the red solution is diluted with water and extracted with ether. The extracts are evaporated to dryness, affording 16 parts by weight of a red oil. The oil is purified by distillation. The product, 6-methyl-6-phenylfulvene, has a boiling point of 90° C. to 108° C. at 2.5 mm. of mercury.

Example XLII

To a solution of 1.44 parts by weight of maleimide in 30 parts by volume of benzene is added a solution of 2.5 parts by weight of 6-methyl-6-phenylfulvene in 15 parts by volume of benzene. This mixture is heated under reflux for three hours. The solution is evaporated to dryness in vacuo. Trituration with petroleum ether affords crystalline 7-(1-phenylethylidine) - 5 - norbornene-2,3-dicarboximide which, after recrystallization from benzene, melts at 159° C. to 161° C.

Example XLIII

To a solution of 6.1 parts by weight of potassium hydroxide, 180 parts by volume of water and 300 parts by volume of ethanol is added 23.4 parts by weight of 7-(1-phenylethylidene) - 5-norbornene-2,3-dicarboximide. The mixture is warmed to achieve solution. After cooling to room temperature, 11.8 parts by weight of dimethylsulfate is added. The mixture is stirred for two hours at room temperature and two hours at reflux. The ethanol is removed in vacuo. After cooling, the product is filtered, washed with ether and dried, yielding 23.2 parts by weight of endo-N-methyl-7-(1 - phenylethylidene)-5-norbornene-2,3-dicarboximide. After two recrystallizations from benzene-hexane, the pure product melts at 170° C. to 172° C.

Example XLIV

To a suspension of 6.5 parts by weight of lithium aluminum hydride in 95 parts by volume of dry tetrahydrofuran is added 9.6 parts by weight of endo-N-methyl-7-(1-phenylethylidene)-5-norbornene - 2,3 - dicarboximide in 130 parts by volume of dry tetrahydrofuran. The reaction mixture is heated at reflux for two hours and stirred at room temperature for eighteen hours. It is then decomposed by adding 20 parts by volume of water cautiously. The inorganic salts are removed by filtration and washed with ether. The total filtrate is evaporated to dryness in vacuo. The product is dissolved in ether and extracted with dilute hydrochloric acid. The acid solution is made basic and extracted with ether. The organic solution is washed with water and saturated sodium chloride solution, dried over magnesium sulfate, filtered and evaporated to dryness in vacuo, yielding 7 parts by weight of product as an oil. The oily base is dissolved in 2-propanol-ether and treated with fumaric acid. There is thus obtained a crystalline fumarate, which is recrystallized from 2-propanol-ether to give pure 3a,4,7,7a-tetrahydro - 2 - methyl-8-(1-phenylethylidene)-4,7-methanoisoindoline fumarate, melting at 164° C. to 165° C.

In a similar manner, following the procedures given above and commencing with the appropriate starting material, there are prepared endo-8-phenyl-4-pyridylmethylene-2-methyl-3a,4,7,7a-tetrahydro - 4,7 - methanoisoindoline; endo-8-phenyl - 3 - pyridylmethylene - 2 - methyl-3a,4,7,7a - tetrahydro - 4,7 - methanoisoindoline; endo-8-phenyl-para-methoxyphenylmethylene-2-methyl-3a,4,7,7a-tetrahydro - 4,7 - methanoisoindoline and 8-di-para-tolylmethylene-2-methyl-3a,4,7,7a-tetrahydro-4,7-methanoisoindoline.

Example XLV

A solution of 2.30 parts by weight of diphenylfulvene and 1.11 parts by weight of N-methyl maleimide in 10 parts by volume of benzene is allowed to stand at room temperature for four days. The solution is concentrated to dryness under reduced pressure, treated with ether, and the resulting solid is collected on a filter, washed with ether, and dried to yield endo-7-diphenylmethylene-N-methyl-5-norbornene-2,3-dicarboximide, melting at 173° C. to 174° C. Concentration of the mother liquors gives an additional quantity of material.

Example XLVI

A mixture of 10 parts by weight of diphenylfulvene and 4.2 parts by weight of maleimide in 75 parts by volume of benzene is heated under reflux for two hours, cooled and diluted with ether. The crystalline product which separates is collected by filtration, washed with ether and dried. Purification by recrystallization from ethyl acetate gives endo-7-diphenylmethylene-5-norbornene-2,3-dicarboximide, melting point 204° C. to 208° C.

Example XLVII

A mixture of 9.2 parts by weight of diphenylfulvene and 5.6 parts by weight of N-carbamoylmaleimide in 100 parts by volume of benzene is heated under reflux for two hours. The initial deep red color of the fulvene disappears and the mixture thickens as the insoluble product separates. The mixture is cooled, diluted with ether, and filtered, and the tan product is washed with ether and dried, giving endo-7-diphenylmethylene-N-carbamoyl-5-norbornene-2,3-dicarboximide, melting at 200° C. to 210° C. with decomposition.

Example XLVIII

A slurry of 11.2 parts by weight of the N-carbamoylimide (supra) in 120 parts by volume of 50% aqueous ethanol is boiled for two hours and then is concentrated to low volume, cooled, and filtered. The solid product is washed with water and dried. There is obtained endo-7-diphenylmethylene - 5 - norbornene-2,3-dicarboximide melting at 204° C. to 208° C. Recrystallization first from acetone and then from ethyl acetate gives the pure imide VII, melting at 208° C. to 210° C.

*Example XLIX*

To a solution of 5.2 parts by weight of 85% potassium hydroxide in 150 parts by volume of water and 250 parts by volume of methanol is added 23.6 parts by weight of endo-7-diphenylmethylene-5-norbornene-2,3-dicarboximide. To the resulting clear solution is added 9.95 parts by weight of dimethylsulfate dropwise with stirring. After about two minutes, a thick slurry is formed. This mixture is allowed to stand for two hours at room temperature and it is then refluxed for two hours. The ethanol is removed under reduced pressure, and the mixture is cooled and filtered, and the solid which is collected is washed with water and dried in the steam oven. There is obtained endo-7-diphenylmethylene-N-methyl-5-norbornene-2,3-dicarboximide, melting at 166° C. to 171° C. with decomposition. Recrystallization from ether affords a product melting at 176° C. to 177.5° C. (dec.).

*Example L*

To 15 parts by weight of endo-7-diphenylmethylene-5-norbornene-2,3-dicarboximide almost completely dissolved in a mixture of 350 parts by volume of hot ethanol and 100 parts by volume of water containing 3.1 parts by weight of potassium hydroxide is added 4.1 parts by weight of ethylene chlorohydrin. The solution is refluxed for one hour, then treated three more times with 3.1 parts by weight of potassium hydroxide in water and 4.1 parts by weight of ethylene chlorohydrin. The treatments are separated by approximately one hour of reflux.

The resultant solution is concentrated in vacuo to remove ethanol. The aqueous mixture is extracted with methylene chloride. The extracts are washed with water, dried over magnesium sulfate, filtered and concentrated to dryness in vacuo. The crude product is recrystallized from methylene chloride-ether, affording 12.9 parts by weight of endo-7-diphenylmethylene-N-beta-hydroxyethyl-5-norbornene-2,3-dicarboximide, melting point 171° C. to 172° C.

*Example LI*

To a slurry of 6.1 parts by weight of lithium aluminum hydride in 500 parts by volume of redistilled tetrahydrofuran is added a solution of 12 parts by weight of endo - 7 - diphenylmethylene-N-beta-hydroxyethyl-5-norbornene-2,3-dicarboximide in 400 parts by volume of tetrahydrofuran. The solution is refluxed for two hours and allowed to stand at room temperature for sixteen hours. It is then hydrolyzed by the cautious addition of 18 parts by volume of water. An additional 500 parts by volume of ether is added and the mixture is stirred in an ice-bath for one-half hour. The mixture is filtered and the inorganics washed well with ether and benzene. The filtrate is then concentrated to dryness in vacuo.

The residual oil is dissolved in methylene chloride-ether and dilute hydrochloric acid. The ether layer is separated. The acid oil and solution are combined, made basic with sodium hydroxide solution and extracted with methylene chloride. The extract is washed with water, dried over magnesium sulfate, filtered and concentrated to dryness in vacuo affording 10.2 parts by weight of an oil.

The oil is dissolved in 25 parts by volume of methanol and treated with a solution of 3.5 parts by weight of fumaric acid in 30 parts by volume of methanol. Dilution with ether and scratching affords crystals, which are filtered, washed with ether and air-dried. The crystalline product is recrystallized from ethanol yielding 6.9 parts by weight of endo-8-diphenylmethylene-3a,4,7,7a-tetrahydro-2-beta-hydroxyethyl - 4,7 - methanoisoindoline fumarate with a melting point of 176° C. to 179° C.

*Example LII*

To a slurry of 2.9 parts by weight of lithium aluminum hydride in 50 parts by volume of dried diethyleneglycol dimethylether is added a solution of 5 parts by weight of endo-7-diphenylmethylene-5-norbornene - 2,3 - dicarboximide in 100 parts by volume of the same solvent. The mixture is stirred at 80° C. for two hours and at room temperature for sixteen hours. The mixture is hydrolyzed by the dropwise addition of 9 parts by volume of water. Anhydrous ether (250 parts by volume) is added and the mixture is stirred at room temperature for one hour. It is then filtered. The inorganic solids are washed well with ether and benzene and the filtrate is concentrated to dryness in vacuo. The oily product is dissolved in ether and extracted twice with 2 N hydrochloric acid. The acid solution is made basic with sodium hydroxide solution and extracted with methylene chloride-ether. The extracts are dried over magnesium sulfate, filtered and concentrated to dryness in vacuo, affording 3.5 parts by weight of oily basic product.

The base is dissolved in acetone and treated with an acetone solution of 1.36 parts by weight of maleic acid. The salt is filtered, washed with acetone-ether and dried, affording 3.3 parts by weight of endo-8-diphenylmethylene-3a,4,7,7a-tetrahydro-4,7-methanoisoindoline maleate, melting at 186.5° C. to 190° C. after two recrystallizations from ethanol.

*Example LIII*

To a solution of 12.35 parts by weight of endo-7-diphenylmethylene-N-methyl-5 - norbornene - 2,3 - dicarboximide in 100 parts by volume of chloroform, cooled in an ice water-salt bath, is added a solution of 5 parts by weight of perbenzoic acid in chloroform. After standing at room temperature for thirty-six hours, the choloroform solution is washed three times with 5% sodium carbonate and once with water. It is then dried over magnesium sulfate, filtered and concentrated to dryness under reduced pressure. The product, endo-7-diphenylmethyl-7-alpha-epoxy-N-methyl-5-norbornene-2,3-dicarboximide, is obtained as white crystals from methylene chloride-ether, and shows a melting point of 181.5° C. to 182.5° C.

*Example LIV*

To a solution of 1 part by weight of exo-7-diphenylmethylene-N-methyl-5-norborene-2,3-dicarboximide in 10 parts by volume of chloroform in an ice-water bath is added dropwise a solution of 0.405 part by weight of perbenzoic acid in chloroform. After standing for twenty-four hours at room temperature, the solution is washed with 5% sodium carbonate solution, dried over magnesium sulfate, filtered and concentrated to dryness under reduced pressure. The product, exo-7-diphenylmethylene-5,6-epoxy-N-methyl-2,3-norbornene - dicarboximide, is crystallized from methylene chloride-ether, yielding 0.92 part by weight, melting point 179.5° C. to 181.5° C.

*Example LV*

To 2 parts by weight of endo-7-diphenylmethylene-N-methyl-2,3-norbornanedicarboximide in 20 parts by volume of chloroform at 0° C. is added 0.80 part by weight of perbenzoic acid in chloroform. After standing for two days at room temperature, the solution is washed three times with 5% sodium carbonate solution and once with water, dried over magnesium sulfate, filtered and concentrated to dryness under reduced pressure. The product, endo-7-diphenylmethyl-7-alpha-epoxy-N-methyl-2,3-norbornanedicarboximide, is crystallized from methylene chloride-ether, affording 1.3 parts by weight, melting point 145° C. to 152° C., 177.5° C. to 180° C.

Example LVI

A 0.5 part by weight sample of endo-7-diphenylmethyl-7-alpha-epoxy-N-methyl-5-norbornene-2,3- dicarboximide is hydrogenated over 0.05 part by weight of platinum in 50 parts by volume of methanol at atmospheric pressure. After a rapid uptake of one equivalent of hydrogen, the reaction stopped. The solution is filtered and concentrated to dryness under reduced pressure. The product, endo-7-diphenylmethyl-7-alpha-epoxy - N - methyl - 2,3-norbornanedicarboximide, is crystallized from methylene chloride-ether in 100% yield, melting point 144° C. to 153° C., 176° C. to 178° C.

Example LVII

A 2 parts by weight sample of endo-7-diphenylmethyl-7-alpha-epoxy-N-methyl-5-norbornene - 2,3-dicarboximide is hydrogenated over 0.5 part by weight of 10% palladium-on-carbon in 100 parts by volume of methanol on a shaker. After six hours, the reaction is stopped and the mixture is filtered. The catalyst is washed well with methylene chloride and the filtrate is concentrated to low volume under reduced pressure. The product is crystallized from methanol and is filtered. There is obtained 1.63 parts by weight of endo-[7-diphenylmethyl-7-hydroxy-N-methyl] - 2,3 - norbornanedicarboximide, melting point 276° C. to 280° C.

Example LVIII

A 0.5 part by weight sample of endo-7-diphenylmethyl-7-alpha-epoxy-N-methyl-2,3-norbornanedicarboximide is hydrogenated over 0.25 part by weight of 10% palladium-on-carbon in 50 parts by volume of methanol on a shaker. After six hours, the reaction is stopped and filtered. Concentration of the filtrate affords crystals from methanol. The crystals are filtered and dried, yielding 0.43 part by weight of endo-[7-diphenylmethyl-7-hydroxy-N-methyl]-2,3-norbornanedicarboximide, melting point 272° C. to 277° C.

Example LIX

To 0.45 part by weight of endo-[7-diphenylmethyl-7-hydroxy - N - methyl]-2,3-norbornanedicarboximide in 25 parts by volume of cold pyridine is added 0.135 part by volume of thionyl chloride, dropwise, with cooling. After standing at room temperature overnight, the solution is diluted with 50 parts by volume of water and extracted three times with chloroform. The extracts are washed with dilute acid, dilute base, and water, dried over magnesium sulfate, filtered and concentrated to dryness under reduced pressure. The product, endo-7-diphenylmethylene-N-methyl-2,3-norbornanedicarboximide, is crystallized from ether-petroleum ether, melting point 148° C. to 151° C.

Example LX

To 30 parts by volume of 5-butanol is added 4.7 parts by volume of 0.3 M potassium-t-butoxide and 0.5 part by weight of endo-[7-diphenylmethyl-7-hydroxy-N-methyl]-2,3 - norbornanedicarboximide. The solution is refluxed for four hours and allowed to stand at room temperature overnight.

The alcoholic solution is diluted out with water, concentrated to remove the t-butanol, and extracted with methylene chloride. The extracts are dried over magnesium sulfate, filtered and concentrated to dryness under reduced pressure, giving 0.22 part by weight of neutral material which is crystallized from methylene chloride-ether to give 0.12 part by weight of endo-[7-diphenylmethyl-7 - hydroxy - N - methyl]-2,3-norbornanedicarboximide, melting at 275° C. to 278° C.

The aqueous alkaline solution is acidified and extracted with methylene chloride. The extracts are dried over magnesium sulfate, filtered and concentrated to dryness under reduced pressure, affording 0.4 part by weight of acidic product. This is dissolved in methanol-benzene and allowed to stand at room temperature for two weeks. During this time the product, 7-diphenylmethyl-7-hydroxy - 3 - [N - methylcarbamoyl] - 2- -norbornanecarboxylic acid is crystallized. After one recrystallization from ethanol-benzene, 7-diphenylmethyl-7- hydroxy-3-[N-methylcarbamoyl] - 2 - norbornanecarboxylic acid shows a melting point of 198.5° C. to 201.5° C.

Example LXI

A batch of 9.8 parts by weight of endo-[7-diphenylmethyl - 7 - hydroxy - N - methyl] - 2,3-norbornanedicarboximide is added to a solution of 50 parts by weight of potassium hydroxide in 250 parts by volume of water and 250 parts by volume of ethanol and refluxed for six hours. The solution is then concentrated under reduced pressure to remove the ethanol and is diluted with 100 parts by volume of water. The solution is cooled and acidified with hydrochloric acid. The crystalline product is filtered and consists of 7-diphenylmethyl-7-hydroxy-2,3-norbornanedicarboxylic acid, melting point 135° C. to 142° C. (dec.).

The normal beta-phenethylamine salt of 7-diphenylmethyl - 7 - hydroxy - 2,3-norbornanedicarboxylic acid is prepared and, after two recrystallizations from ethanol, is melted at 135.5° C. to 137.5° C.

Example LXII

To a 1 part by weight sample of 7-diphenylmethyl-7-hydroxy - 2,3 - norbornanedicarboxylic acid is added 5 parts by volume of actyl chloride. The mixture is heated for two hours at 60° C., affording a clear solution. The acetyl chloride is then boiled off and the residue dried under reduced pressure. The residue is dissolved in chloroform and washed three times with 5% sodium bicarbonate. The chloroform solution is dried over magnesium sulfate, filtered and concentrated to dryness under reduced pressure, yielding 0.75 part by weight of non-crystalline neutral product. This material is crystallized in petroleum ether and is twice recrystallized from methylene chloride-ether, melting point 224° C. to 225.5° C.

Example LXIII

A solution of 4.5 parts by weight of 7-diphenylmethyl-7 - hydroxy - 2,3-norbornanedicarboxlic acid in 100 parts by volume of methanol is titrated with an etheral solution of diazomethane until the yellow color of the reagent persists. After standing at room temperature overnight, the solution is concentrated to dryness under reduced pressure. The oily product is dissolved in methylene chloride-ether and washed twice with 5% sodium bicarbonate solution and once with water. The organic solution is dried over magnesium sulfate, filtered and concentrated to dryness under reduced pressure, affording 100% of dimethyl - 7 - diphenylmethyl - 7 - hydroxy-2,3-norbornanedicarboxylate, an oil.

Example LXIV

To a solution of 5.6 parts by weight of sodium in 60 parts by volume of absolute methanol is added a solution of 3 parts by weight of dimethyl-7-diphenylethyl-7-hydroxy-2,3-norbornanedicarboxylate. The solution is refluxed for five hours and allowed to stand at room temperature overnight. It is then diluted with water, concentrated to remove the methanol, and refluxed for two hours. The aqueous solution is then washed twice with ether, acidified with dilute hydrochloric acid and extracted three times with methylene chloride-benzene. The extracts are concentrated to dryness under reduced pressure. The product is crystallized from methylene chloride, affording the A isomer of 7-diphenylmethyl-7-hydroxy-2,3-norbornanedicarboxylic acid, melting point 140° C. to 145° C. The mother liquid affords the B isomer of 7-diphenylmethyl-7-hydroxy-2,3-norbornanedicarboxylic acid, melting point 258° C. to 260° C.

Example LXV

A 90 parts by weight sample of the A isomer of 7-diphenylmethyl-7-hydroxy - 2,3 - norbornanedicarboxylic acid is treated with 0.5 part by volume of acetyl chloride and warmed at 60° C. for two hours. The acetyl chloride is boiled off and the product is dried under reduced pressure. It is then dissolved in chloroform and extracted three times with 5% sodium bicarbonate. The aqueous solution is acidified with dilute hydrochloric acid and the gummy solid is crystallized from ethylene chloride. After two recrystallizations from aqueous ethanol, the product, the A isomer of 7-diphenylmethyl-7-hydroxy-2,3-norbornanedicarboxylic acid, gamma-lactone, melts at 191° C. to 192.5° C.

Example LXVI

A 100 parts by weight sample of the B isomer of 7-diphenylmethyl-7-hydroxy - 2,3 - norbornanedicarboxylic acid, gamma-lactone is treated with 0.5 part by volume of acetyl chloride. Even after warming for two hours, solution is not obtained. The mixture is then warmed overnight at 60° C. The crystalline product is dried under reduced pressure, affording 100% of the B isomer of 7-diphenylmethyl-7-hydroxy - 2,3 - norbornanedicarboxylic acid, gamma-lactone, melting point 253° C. to 259° C.

Example LXVII

To 7 parts by weight of the endo-8-diphenylmethylene-2-methyl-3a-4,7,7a-tetrahydro-4,7-methanoisoindoline in 70 parts by volume of chloroform in an ice-water bath is added a chloroform solution of perbenzoic acid. After standing for three days at room temperature, the solution is washed well with 5% sodium carbonate solution and concentrated under reduced pressure. The product is dissolved in methylene chloride, dried over magnesium sulfate, filtered and concentrated to dryness under reduced pressure, affording about 12 parts by weight of crude products.

The crude products are dissolved in benzene and shaken with dilute hydrochloric acid, giving three layers, an aqueous layer containing isoluble material, an oily benzene-insoluble layer, and a benzene solution. The benzene layer is separated.

The other two layers are made basic with aqueous sodium hydroxide and extracted with methylene chloride. The extracts are washed with water, dried over magnesium sulfate, filtered and concentrated to dryness under reduced pressure, giving 9.1 parts by weight of oily basic product.

The basic product is dissolved in acetone and treated with an acetone solution of 2.6 parts by weight of maleic acid. After diluting with ether, a crystalline salt is obtained. The salt is recrystallized twice from methanol, affording endo-8-diphenylmethylene-5,6-epoxy-2-methyl-3a,4,5,6,7,7a-hexahydro-4,7-methanoisoindoline maleate, melting point 151° C. to 152° C.

Example LXVIII

To a slurry of 1.62 parts by weight of lithium aluminum hydride in 25 parts by volume of tetrahydrofuran is added a solution of 2 parts by weight of endo-7-diphenylmethyl-7-alphaepoxy-N-methyl-5-norbornene - 2,3 - dicarboximide in 25 parts by volume of tetrahydrofuran. The mixture is stirred at room temperature for forty-eight hours and then hydrolyzed by the cautious addition of 5 parts by volume of water. The mixture is stirred for two hours and filtered, and the inorganics are washed thoroughly with tetrahydrofuran. The filtrate is concentrated to dryness under reduced pressure. The oily product is dissolved in either, dried over magnesium sulfate, filtered and concentrated to dryness under reduced pressure, affording 90% of a viscous oily product.

A fumarate salt of the product is prepared in isopropyl alcohol. After one recrystallization from isopropyl alcohol, the white, crystalline fumarate of endo-8-diphenylmethyl - 3a,4,7,7a-tetrahydro-2-methyl-4,7-methanoisoindolinol shows a melting point of 217° C. to 220° C. (dec.).

Example LXIX

To a slurry of 1.07 parts by weight of lithium aluminum hydride in 50 parts by volume of tetrahydrofuran is added a solution of 2 parts by weight of endo-7-diphenylmethyl-7-alphaepoxy-N-methyl - 2,3 - norbornane dicarboximide in 75 parts by volume of tetrahydrofuran. After standing at room temperature for forty-eight hours, the mixture is hydrolyzed by the cautious addition of 3.1 parts by volume of water. After stirring for three hours, the mixture is filtered and the inorganics washed well with tetrahydrofuran. The filtrate is concentrated under reduced pressure. The product is dissolved in ether, dried over magnesium sulfate, filtered and concentrated to dryness under reduced pressure, affording endo-8-diphenylmethyl-3a,4,5,6,7,7a-hexahydro-2-methyl - 4,7-methanoisoindolinol.

Example LXX

To a solution of 3.7 parts by weight of lithium aluminum hydride in 35 parts by volume of tetrahydrofuran is added dropwise a solution of 7 parts by weight of endo-[7-diphenyl-methyl-7-hydroxy-N-methyl] - 2,3 - norbornanedicarboximide in 150 parts by volume of warm tetrahydrofuran. The solution is stirred for two hours at room temperature and at reflux for forty-five minutes and then allowed to stand at room temperature overnight.

The reaction mixture is then hydrolyzed by the cautious addition of 11 parts by volume of water. The mixture is filtered and the inorganics washed well with tetrahydrofuran and benzene. The filtrate is concentrated to dryness under reduced pressure. The oily product is dissolved in methylene chloride-ether and dried over magnesium sulfate. After filtration, the solution is concentrated to dryness under reduced pressure, affording 6.6 parts by weight of oily product.

The fumarate of the oily product is prepared in methanol-ether, giving endo-[8-diphenylmethyl-3a,4,5,6,7,7a-hexahydro - 2 - methyl-4,7-methano-8-isoindolinol] fumarate, melting point 219° C. to 221° C. (dec.).

Example LXXI

A sample (6.5 parts by weight) of endo-8-diphenylmethylene - 2 - methyl-3a,4,7,7a-tetrahydro-4,7-methanoiosindoline is dissolved in 150 parts by volume of methanol-benzene and treated with 3.7 parts by weight of methyl iodide. The solution is stirred for one hour at room temperature and fifteen minutes at reflux. The solution is concentrated in vacuo and diluted with ether. The product, endo-8-diphenylmethylene-2,2-dimethyl - 3a,4,7,7a-tetrahydro-4,7-methanoisoindolinium iodide, is filtered, washed with ether and dried, yielding 8.5 parts by weight, melting at 260° C. to 262° C. with decomposition.

What is claimed is:

1. A member selected from the group consisting of 7-$R_1,R_2$-Y-2-$R_3$-3-$R_4$-5-norbornene and the corresponding norbornanes, wherein $R_1$ and $R_2$ each is phenyl; $R_3$ and $R_4$ each is a member selected from the group consisting of carboxamide, mono-loweralkyl-aminocarbonyl, di-loweralkyl-aminocarbonyl, N-$\beta$-phenethyl-aminocarbonyl and carboxyl, wherein when one of $R_3$ and $R_4$ is a carboxamide, the other is carboxyl, and when one of $R_3$ and $R_4$ is carboxyl, the other is a carboxamide; and Y is a member selected from the group consisting of methyl and methylene wherein when Y is methyl, the 7-position carbon atom is further substituted with hydroxyl.

2. 7 - diphenylmethylene - 2 - methyl-carboxamido-5-norbornene-3-carboxylic acid.

3. 7 - diphenylmethylene - 2 - (N-beta-phenethylcarboxamido)-5-norbornene-3-carboxylic acid.

4. 7-diphenylmethylene-2-carboxamido-5-norbornene-3-carboxylic acid.

5. 7-diphenylmethylene-2-methyl-carboxamido-norbornane-3-carboxylic acid.

6. 7-diphenylmethylene-2-(N-beta-phenethylcarboxamido)-norbornane-3-carboxylic acid.

7. 7-diphenylmethylene-2-dimethyl-carboxamido-5-norbornene-3-carboxylic acid.

8. 7-diphenylmethylene-2-dimethyl-carboxamido-norbornane-3-carboxylic acid.

9. 7-diphenylmethylene-2-dimethyl-carboxamido-5-norbornene.

10. 7-diphenylmethylene-2-methyl-carboxamido-norbornane.

11. 7-diphenylmethyl-7-hydroxy-3-[N-methylcarbamoyl]-2-norbornanecarboxylic acid.

References Cited by the Examiner

UNITED STATES PATENTS

| 2,885,435 | 8/56 | Pursglove | 260—518 |
| 2,940,984 | 6/60 | Applequist et al. | 260—346.3 |
| 3,019,233 | 1/62 | Chinn | 260—343.3 |
| 3,028,428 | 4/62 | Vander Stelt | 260—570 |

OTHER REFERENCES

Alder et al.: Chemical Abstracts, vol. 44 (1950), pages 4426–30.

WALTER A. MODANCE, *Primary Examiner.*

IRVING MARCUS, NICHOLAS A. RIZZO, *Examiners.*

UNITED STATES PATENT OFFICE
CERTIFICATE OF CORRECTION

Patent No. 3,203,983                                                August 31, 1965

George Ireland Poos

It is hereby certified that error appears in the above numbered patent requiring correction and that the said Letters Patent should read as corrected below.

Column 1, line 68, for "-$R_5$-3-$R_3$" read -- -$R_5$-3-$R_4$ --; column 3, line 72, for "size" read -- use --; column 4, line 51, for "-1,3-dicarboxylic" read -- -2,3-dicarboxylic --; column 5, line 58, for "wth" read -- with --; column 7, lines 12 and 13, for "-(N-beta-phenethylcarbamido-" read ---(N-beta-phenethylcarbamido)- --; column 9, line 17, for "after" read -- After --; column 11, line 41, after "melting" insert -- at --; column 12, line 7, for "193° C." read -- 183° C. --; line 36, for "endo-1-m-" read -- endo-7-m- --; column 13, line 4, for "180° C." read -- 184° C. --; column 18, line 61, for "-diphenylethyl-" read ---diphenylmethyl- --; line 73, for "liquid" read -- liquor --; column 19, line 10, for "ethylene" read -- methylene --; line 28, strike out "the"; same column 19, line 71, for "either" read -- ether --; column 20, line 19, for "dryiness" read -- dryness --.

Signed and sealed this 29th day of March 1966.

(SEAL)
Attest:

ERNEST W. SWIDER                              EDWARD J. BRENNER
Attesting Officer                            Commissioner of Patents